(12) United States Patent
Muthu (10) Patent No.: US 6,507,159 B2
(45) Date of Patent: Jan. 14, 2003

(54) CONTROLLING METHOD AND SYSTEM FOR RGB BASED LED LUMINARY

(75) Inventor: Subramanian Muthu, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 84 days.

(21) Appl. No.: 09/820,517

(22) Filed: Mar. 29, 2001

(65) Prior Publication Data

US 2002/0171373 A1 Nov. 21, 2002

(51) Int. Cl.$^7$ ................................................ H05B 37/02
(52) U.S. Cl. ........................ 315/307; 315/308; 362/800
(58) Field of Search ................................. 315/307, 308; 362/184, 185, 800

(56) References Cited

U.S. PATENT DOCUMENTS 6,305,818 B1 * 10/2001 Lebens et al. ............... 362/157

* cited by examiner

Primary Examiner—David Vu (57) ABSTRACT

A method and a system for controlling a RBG based LED luminary which tracks the tristimulus values of both feedback and reference whereby the forward currents driving the LED luminary are adjusted in accordance with the errors between the feed tristimulus values and the reference tristimulus values until the errors are zero.

30 Claims, 8 Drawing Sheets

CONTROLLING METHOD AND SYSTEM FOR RGB BASED LED LUMINARY

TECHNICAL FIELD

The present invention relates to RGB based LED luminary, and more particularly, to a method and system for controlling an RGB based LED luminary, in which the forward currents driving the LED luminary are adjusted in accordance to the difference in tristimulus values between the mixed output light of the luminary and a desired light so that the LED luminary generates the desired color and the lighting levels.

BACKGROUND OF THE INVENTION

As well known in the art, Red, Green and Blue (RGB) LED based luminary is used for generating various colors of light included in the white light, which are widely used in applications such as LCD back lighting, commercial-freezer lighting, white light illumination, etc. The illumination by LED based luminaries presents difficult issues because the optical characteristics of the LEDs vary with temperature, forward current, and aging. In addition, the characteristics of the individual LEDs vary significantly batch-to-batch for the same LED fabrication process. Therefore, the quality of the light produced by the RGB based LED luminary can vary significantly and the desired color and the required lighting level of the white light can not be obtained without a suitable feedback system.

One known prior art system uses a lumen-feedback—temperature-feed forward controlling system for controlling a white LED luminary to provide a constant color with fixed lumen output white light. The temperature-feed forward compensation system provides compensation for the variations in the color temperature due to the junction temperature and supplies the reference lumens. The lumen feedback controlling system regulates each RGB LED lumens to the reference lumens. This controlling system requires the characterization of LED with the temperature, which requires a costly factory calibration. In addition, it also requires switching-off the LED light sources briefly for light measurements. The switching-off of the LED light sources introduces a flicker phenomenon and thereby the power supplies must have fast response time. In addition, a PWM driving method is required to overcome the LED variations with forward current. With the PWM control, the implementation becomes complex and, in addition, the LEDs are not utilized to their full capacity.

Therefore, there exists a need in the art of a less-costly controlling system for controlling the RGB based LED luminaries without the above problems in the prior art.

SUMMARY OF THE INVENTION

The present invention discloses a novel controlling method as well as a system for controlling a RGB based LED luminary, which compares the feedback tristimulus values representative of the mixed output light of the RGB based LED luminary with the referenced tristimulus values representative of the desired light, and adjusts the forward currents of the LED luminary in such a way that the difference in tristimulus values is decreased to zero.

Particularly, the controlling system comprises a feedback unit including photodiodes for generating the feedback tristimulus values of the LED luminary, and a controller for acquiring the difference between the feedback tristimulus values and the desired reference tristimulus values, and generating control voltages for adjusting the forward currents of the LED luminary so that the difference in tristimulus values is decreased to zero.

The tristimulus values under comparison may be either under CIE 1931 tristimulus system or under a new RGB calorimetric system, but in either case the controlling of the luminary tracks the reference tri-stimulus values. Thus, under a steady-state where the feedback tristimulus values follow the desired reference tristimulus values, the light produced by the LED luminary has the desired target color temperature and the lumen output, which are regulated precisely to the targets regardless of the variations in the junction temperature, forward current and aging of the LEDs.

Since the tri-stimulus values of the mixed light are measured for the control, the controlling method of the present invention does not require a factory calibration for obtaining the temperature related characteristics of the LEDs. In addition, it overcomes the batch-to-batch variations in the LEDs, which can lead to significant cost reduction due to the use of any LEDs in a batch.

Since only the mixed light is measured by the photodiodes regardless of the individual components of the Red, Green and Blue LED light sources, this scheme does not require switching-off the power supplies for light measurement. Therefore, the power supply does not need fast transient response. In addition, the limit on the ripple in the LED drive can be larger due to the fact that the LED tolerates higher ripples and the higher ripple does not affect the performance of the system. These factors contribute for cost savings on the power supplies.

The above and other features and advantages of the present invention will be clearer upon reading the following detailed description of the preferred embodiments with reference to the accompanying drawings in which:

DETAILED DESCRIPTION OF THE PREFERRED EMBODIMENT

Figure 1:
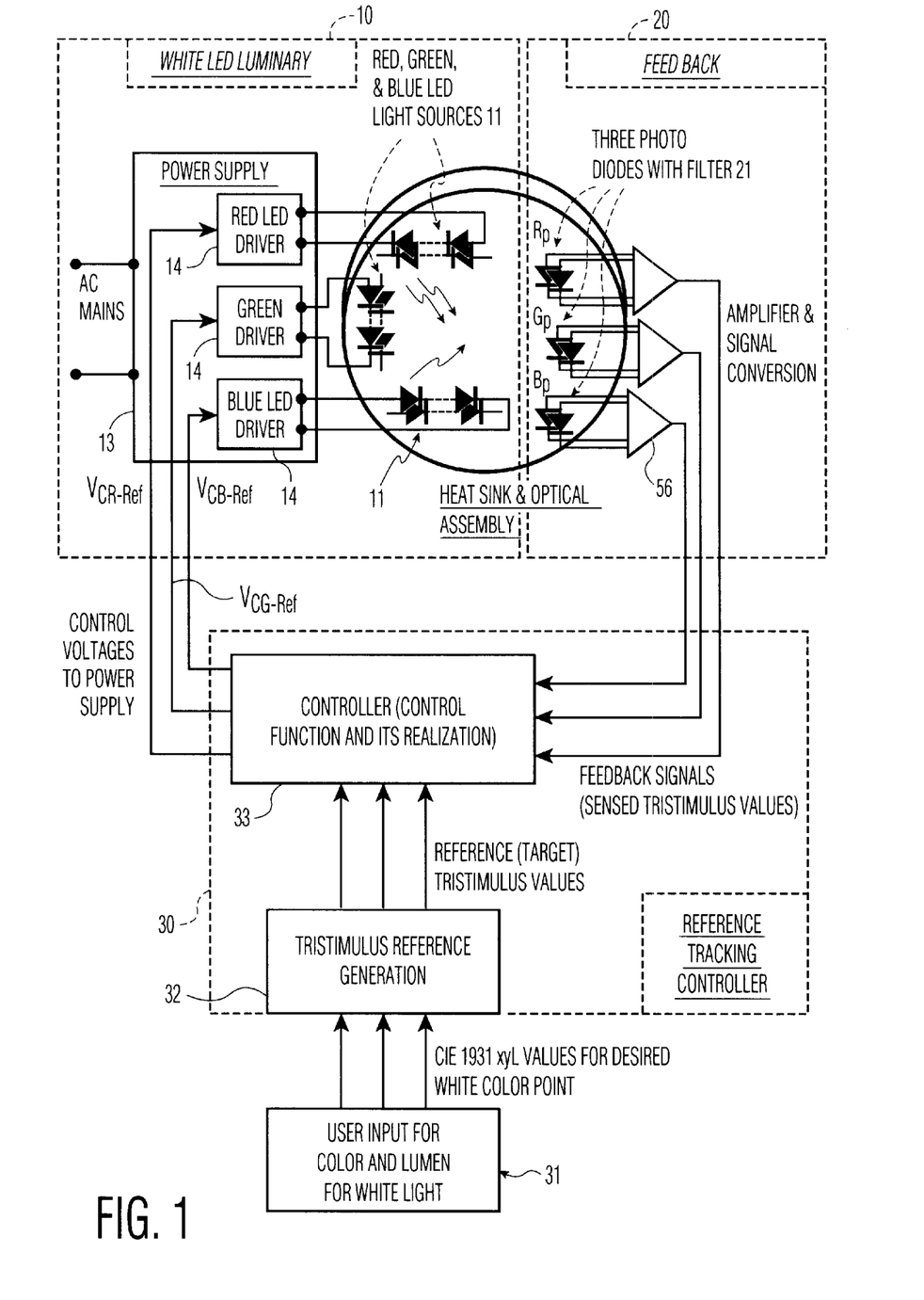
FIG. 1 is a schematic illustration showing a RGB based LED luminary incorporated with a closed loop controlling system of the present invention.

Reference is made to FIG. 1 which illustrates the components of the RGB based white LED luminary system including a white LED luminary 10, a feedback unit 20 and a reference tracking controller 30. As an exemplary embodiment, a white LED luminary 10 is described here, but it shall be appreciated that the present invention is applicable to any other color of light.

The white LED luminary 10 comprises of Red, Green, and Blue (RGB) LED light sources 11, optical assembly and heat sink 12, and power supply 13 with three independent Red, Green, and Blue LED drivers 14. Each LED light source 11 is made of a plurality of LEDs with similar electrical and optical characteristics, which are connected in a proper series and parallel combinations to make a light source. The LEDs are mounted on the heat sink and their arrangement in the heat sink is subjected to the application of the white LED luminary 10 such as backlighting and white light illumination for freezers. Depending on the application, proper optics is used to mix the light outputs of the RGB LED light sources 11 to produce the white light.

The LED light sources 11 are driven by a power supply 13, which comprises of three independent drivers 14 for the RGB LED light sources 11. The power supply 13 and the drivers 14 for the LED light sources 11 are based on suitable AC-to-DC, DC/DC converter topologies. The RGB LED drivers 14 receive LED forward current reference signals in the form of the control voltages $V_{CR-ref}$, $V_{CG-ref}$, and $V_{CB-ref}$ from the reference-tracking controller 30 and supply the necessary forward currents to the RGB LED light sources 11. The LED drivers 14 contain current feedback and suitable current controlling systems, which make the LED forward currents to follow their references. Here, the control voltages $V_{CR-ref}$, $V_{CG-ref}$, and $V_{CB-ref}$ are the references to the current controlling systems for the respective forward currents that drive the LED light sources 11.

The feedback unit 20 contains three photodiodes 21 with filters and the necessary amplifier and signal conversion circuits to convert the output of the photodiodes 21 to an electrical signal that can be used by the reference-tracking controller 30. The photodiodes 21 are mounted in a suitable place inside the optical assembly in such a way that the photodiodes 21 receive sufficient mixed light. Therefore, the corresponding photocurrents are higher than the noise levels and can be distinguished from the noise. The photodiodes 21 are also shielded such that the stray and the ambient light are not measured by the photodiodes 21. The details of the placement of the photodiodes 21 are specific to the applications. The amplifier and signal conversion circuits convert the photocurrents to voltage signals with proper amplifications.

The reference-tracking controller 30 consists of a user interface 31, a reference generator 32 and a control function unit 33 for implementing control functions. The reference-tracking controller 30 can be realized either in analog or digital form, but the digital implementation using microprocessor and micro-controller is preferable. The user interface 31 obtains the desired white color point and the lumen output of the white light from the user and converts them into appropriate electrical signals, which is used to generate a tristimulus reference at the reference generator 32. The reference from the generator 32 and the feedback signals from the feedback unit 20 are input to the control function unit 33 of the reference-tracking controller 30.

The controller 30 contains the necessary control function unit 33 to track and control the mixed light produced by the white LED luminary 10. The outputs of the user interface 31, which represent the desired color and the lumen output for the white light are first input to the reference generator 32. The reference generator 32, based on these user input signals, derives the necessary reference signals for the control function unit 33. The feedback signals for the control function unit 33 are derived from the outputs of feedback 20. Then the control function unit 33 obtains the necessary control voltages for the power supplies based on the state of feedback signals and the reference signals, which in turn changes the forward currents for the LED light sources such that the feedback signals follows the reference. When the system reaches steady state condition, the controller 30 makes the feedback signals to follow the reference signals. Since the feedback signals represents the white light produced by the white LED luminary 10, the light output from the luminary 10 is then regulated to have the desired color point and the lumen output, which are maintained regardless of the temperature and forward currents of the LEDs.

It is noted that the output signals from the feedback unit 20 and the reference signals input by the user are in two different systems, i.e., CIE 1931 tristimulus system and a new RGB colorimetric system. The tristimulus values in the two systems are linearly convertible to each other, as will be explained in detail below.

Specifically, the user interface 31 supplies the desired color temperature and the lumen output of the white light. The color of the white light is represented by the CIE 1931 chromaticity coordinates, $x_{w-ref}$, and $y_{w-ref}$. The desired lumen output is given in the form of dimming level, which is converted to lumen output, $L_{w-ref}$. The tristimulus values of the input desired reference white light are in the CIE 1931 tristimulus system as obtained as follows:

$$Y_{w-ref} = \frac{L_{w-ref}}{683}$$

$$X_{w-ref} = \frac{x_{w-ref}}{y_{w-ref}} * Y_{w-ref}$$

$$Z_{w-ref} = \frac{1 - x_{w-ref} - y_{w-ref}}{y_{w-ref}} * Y_{w-ref}$$

The three photodiodes 21 with filters and the amplifier combinations supply the feedback signals, which represents the tristimulus values in a new RGB colorimetric system. The tristimulus values in the new RGB colorimetric system are transformable into CIE 1931 tristimulus values, which are disclosed in the patent application Ser. No. 779016, entitled "METHOD AND SYSTEM FOR SENSING TRISTIMULUS VALUES FOR CONTROLLING A LUMINARY" which illustrates a transformation technique to obtain the CIE 1931 tristimulus values by using three photodiodes and filter combinations (The CIE 1931 tristimulus values represent the color and the lumen of a light source). In this approach, the CIE 1931 tristimulus values are obtained from the outputs of the photodiodes by using a transformation technique, which is defined as follows:

$$\begin{bmatrix} X_w \\ Y_w \\ Z_w \end{bmatrix} = [T_{RGB-XYZ}]_{3\times 3} \cdot \begin{bmatrix} R_w \\ G_w \\ B_w \end{bmatrix}$$

Here, $R_w$, $G_w$, and $B_w$ are the outputs of the photodiodes and the $X_w$, $Y_w$, and $Z_w$ are the corresponding CIE 1931 tristimulus values for the light source. The transformation matrix $T_{RGB-XYZ}$ is used to transform outputs of the photodiode-amplifier combinations to the CIE 1931 tristimulus, and the method to obtain the coefficients of this matrix is illustrated in the above-mentioned patent application Ser. No. 779016. It must be noted here that a new calorimetric system can be defined (e.g., RGB) and the outputs of the photodiodes [$R_w$, $G_w$, $B_w$] are the equivalent tristimulus values in the new RGB calorimetric system corresponding to the CIE 1931 tristimulus values [$X_w$, $Y_w$, $Z_w$].

Thus the outputs of the photodiodes 21 and the amplifier combination provides a means to sense the tristimulus values of the mixed light produced by the white LED luminary 10. When the reference signals are also derived in the form of tristimulus values, a reference tracking controlling system is devised with the reference and the feedback signals for the mixed white light output from the white LED luminary 10. By changing the forward currents driving the LED light sources 11, the tristimulus values for the light produced by the white LED luminary 10 also change, and therefore, the three forward currents for the RGB LED light sources 11 become the control inputs. Depending on the state of reference and feedback signals, the control function unit 33 controls the three forward currents for the RGB LED light sources 11 to bring the difference or error between the reference and the feedback signals to zero. Since the power supply 13 and the LED drivers 14 supply the forward currents, the controller 30 supply the necessary control voltages to the LED drivers 14 which will then supply the forward currents.

The control function can be made to regulate either the CIE 1931 tristimulus values [$X_w$, $Y_w$, $Z_w$] or the equivalent tristimulus values [$R_w$, $G_w$, $B_w$] in the RGB calorimetric system to their corresponding reference tristimulus values. Since, the transformation between the CIE 1931 tristimulus values [$X_w$, $Y_w$, $Z_w$] and the RGB system is linear, the control of the white LED luminary 10 is identical in both the cases. However, the reference-input signals must be derived in the appropriate form, and the function of the reference-tracking controller takes different forms depending on the controlled quantity, which are shown in FIG. 2 and FIG. 3.

Figure 2:
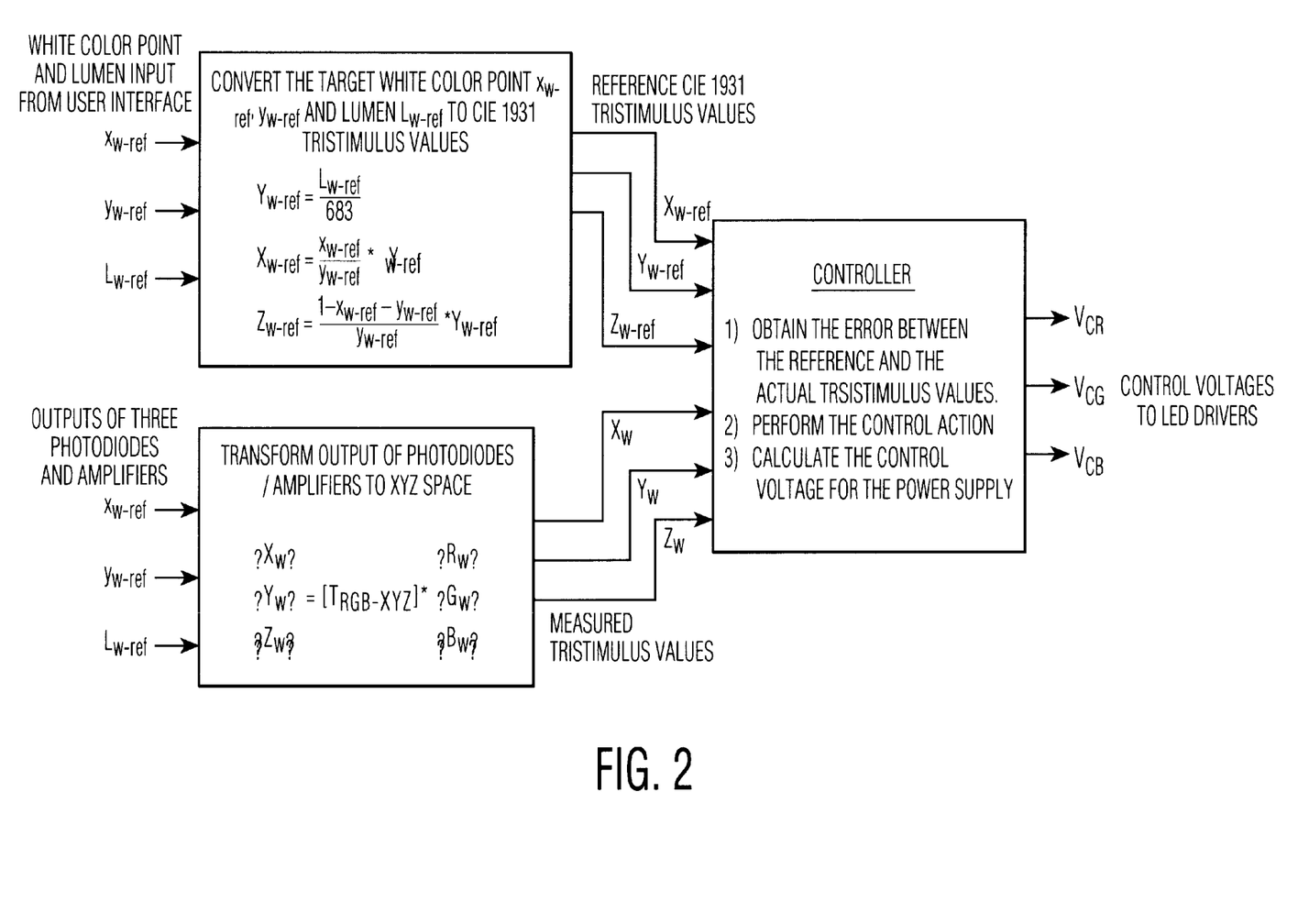
FIG. 2 shows the functions of the controller in which the controller tracks the CIE 1931 tristimulus values.

In FIG. 2, the reference tracking controlling system tracks the CIE 1931 XYZ tristimulus values of the light output from the white LED luminary 10 to follow their reference. The reference CIE 1931 tristimulus values are first obtained from the user interface 31 for the desired color and lumen output of the white light and are input to the control function unit 33. The photodiodes 21 with the filters supply the tristimulus values for the mixed light in the RGB colorimetric system. The CIE 1931 tristimulus values for the light output from the white LED luminary 10 are obtained by applying the transformation matrix [$T_{RGB-XYZ}$] on the outputs of the photodiode 21 and amplifier combinations. The sensed CIE 1931 tristimulus values are also input to the control function unit 33. The control function in the control function unit 33 is chosen properly to provide a stable closed system with the desired transient response, which will be explained later. The control function unit 33, based on the error between the reference signals and the feedback signals, generates the control voltages for the power supply 13. The control function unit 33 is a MIMO system and it simultaneously controls the RGB LED forward currents to bring the error to zero.

Figure 3:
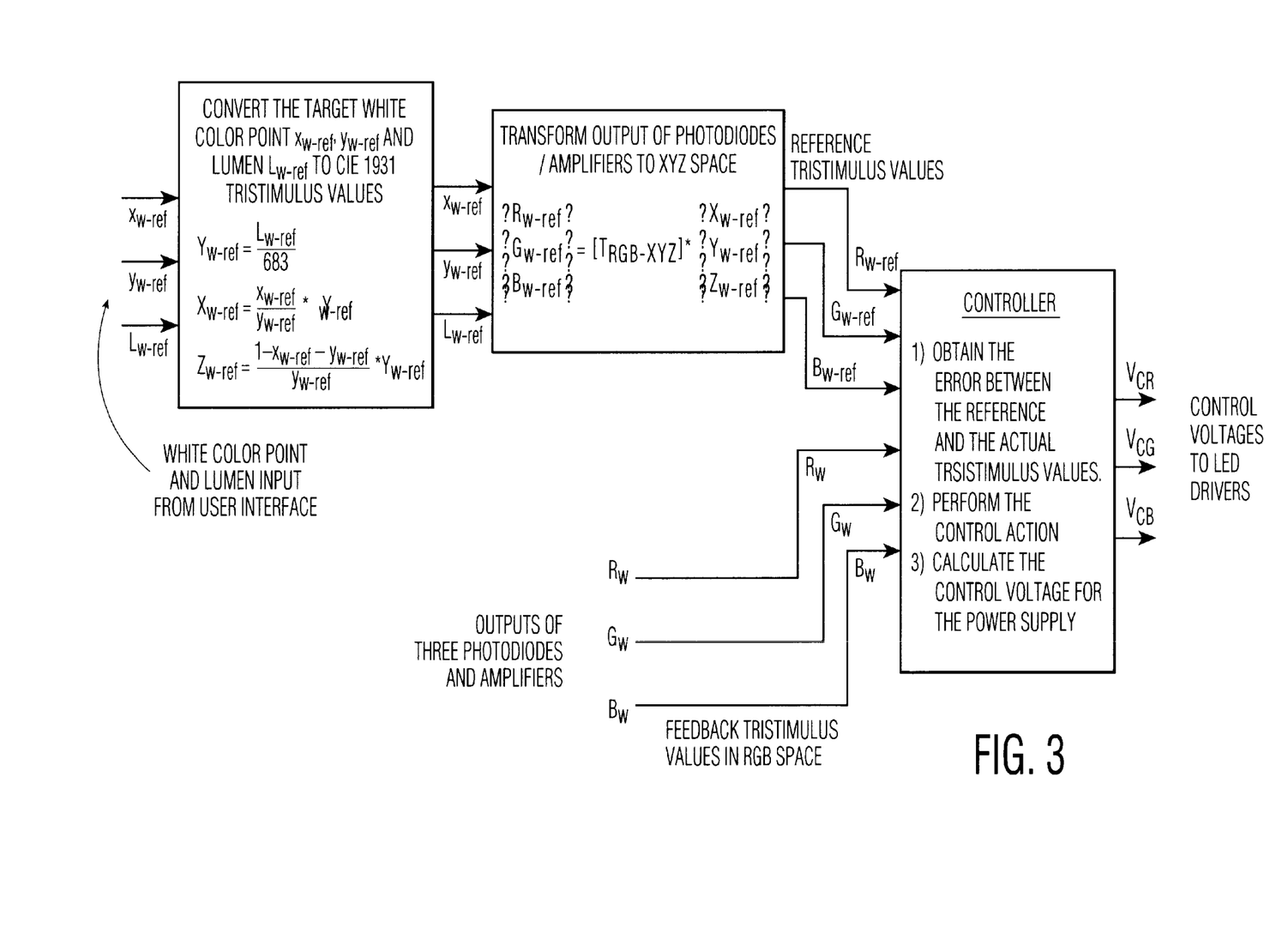
FIG. 3 shows the functions of the controller in which the controller tracks the tristimulus values in the RGB colorimetric system.

The tracking of the color point and the lumen output of the white light can also be achieved by having the controller 30 to track the equivalent tristimulus values in the RGB color space as shown in FIG. 3. In this case, the reference values for the CIE 1931 tristimulus values are transformed to RGB system and are input to the control function unit 33 as the reference signals (Here, the transformation matrix [$T_{XYZ-RGB}$] is the inverse of [$T_{RGB-XYZ}$]):

$$\begin{bmatrix} R_{w-ref} \\ G_{w-ref} \\ B_{w-ref} \end{bmatrix} = [T_{XYZ-RGB}] \cdot \begin{bmatrix} X_{w-ref} \\ Y_{w-ref} \\ Z_{w-ref} \end{bmatrix}$$

The outputs of the photodiode 21 and amplifier combinations are directly input to the control function unit 33, which then tracks the tristimulus values to follow their reference.

The user input has the means to supply information of desired white light in appropriate form. Push-button switches with predetermined settings for color and dimming level, or the potentiometers can be used to supply electrical signals, which can be interpreted for the color and the lumen output. If the controller 30 is implemented in digital form, these values can be stored in memory arrays, and depending on the user selection, these can be read out from the memory. By this approach, the user interface 31 for the selection of color and the lumen output is made easier and has the advantage of simplicity.

It must be noted that the control function is an multi-input-multi-output (MIMO) function with the tristimulus values being the outputs and the three forward currents being the control inputs. Therefore the steady state is only reached when all the three errors go to zero. Under steady state condition, the feedback signals follow the reference signals, which are derived from the desired color and lumen output of the white light. Therefore, the white light produced by the white LED luminary 10 contains the desired color and the lumen output.

Since only the tristimulus values of the mixed light from the white LED luminary 10 are sensed, this scheme does not require sensing the light output from the individual LED light sources 11. Thus it eliminates the need of switching-off the LED light sources 11 for light measurement, and therefore, the power supply 13 does not require fast transient characteristics. In addition, the LED forward current is supplied in the form of DC current and therefore, the PWM driving scheme is not required to supply the average current. Since, any variations in the lumen output and the color of the white light due to the forward current is corrected by the control voltage, the forward current is delivered by DC current and the need for the complex PWM method is eliminated. Moreover, the amount of ripple in the forward current can be increased without any performance degradation, which can results in the reduction of cost for the power supply. This is possible with the added filters to the photodiode 21 and amplifier combination to remove the ripple in the measurement of tristimulus values.

Since the tristimulus values are controlled in this control method, the batch-to-batch variations in the LEDs are overcome. This method does not require characterization of LED at the factory that is needed for the temperature feed forward system.

A properly designed reference tracking controlling system thus brings the error or difference between the reference and the feedback signals to zero. Therefore, the accuracy of this controlling system depends on the photodiode and the transformation matrix used to sense the tristimulus values.

In order to achieve a stable closed loop controlling system with the desired transient response, the control function must be designed properly. For this, the transfer functions for the RGB LED luminary 10 and the power supplies 13 are first obtained. It must be noted that the characteristics of the LEDs vary with the temperature, forward current and batch-to-batch. Therefore, any transfer function model obtained for the LEDs depends on one particular operating condition, and thereby, an invariant model for the white LED luminary does not exists. Then, the control model for the LEDs 11 and the white LED luminary 10 depends on the number of LEDs 11 used in the luminary 10, their characteristics and the operating point. The inaccuracy in the model is overcome by using a controller 30 with certain degree of robustness for the variations in the characteristics of the luminary 10. Nevertheless, the transfer function model is obtained with the tristimulus values as the outputs and the forward currents as the control inputs, which is an multi-input-multi-output (MIMO) system The second step in the design of the controlling system is to obtain the transfer function of the LED driver 14 and the power supply 13. The transfer function is obtained with the LED forwards currents as the outputs and the control voltages as the inputs. The small-signal modeling approach is used for this purpose.

Figure 4:
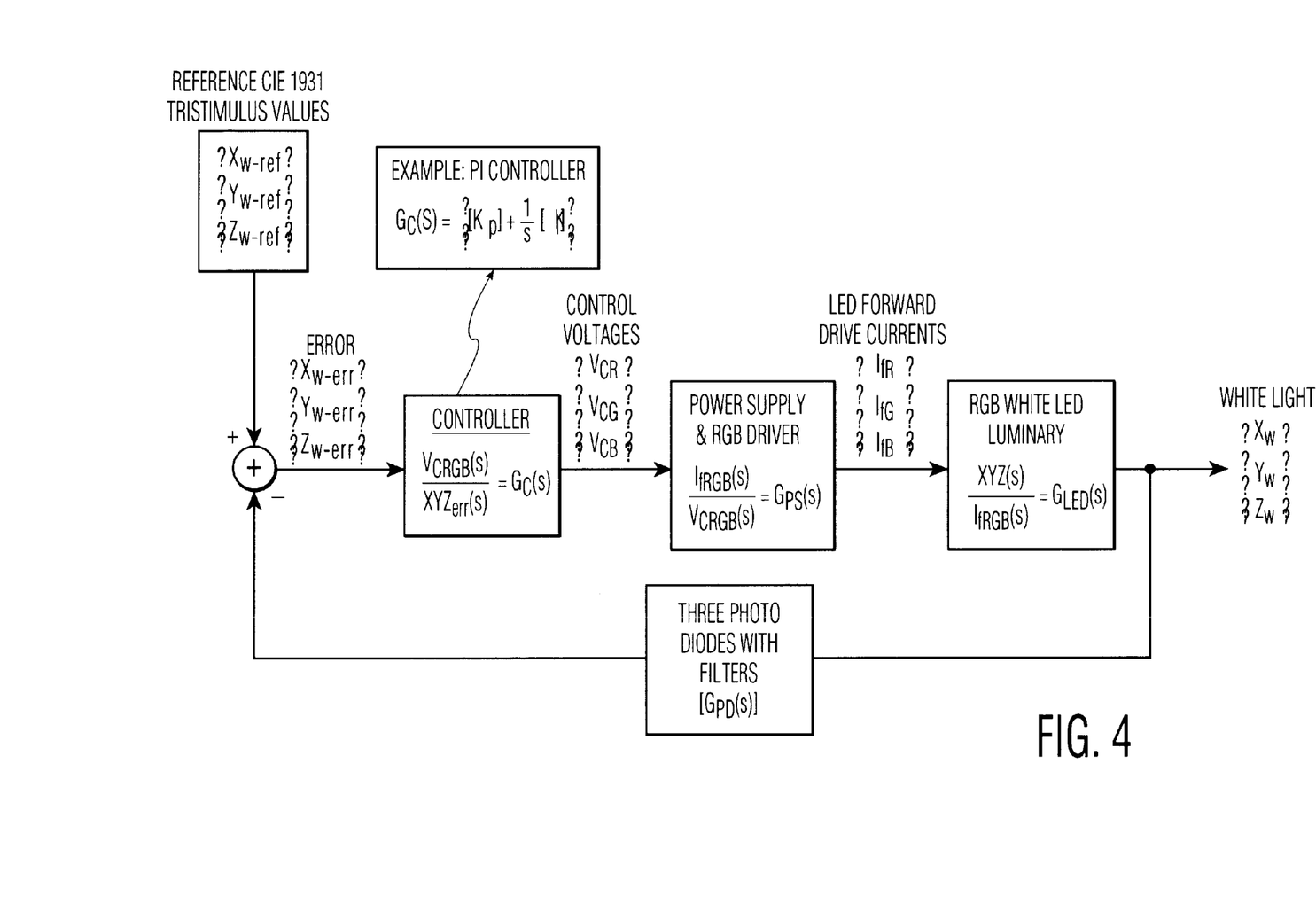
FIG. 4 illustrates the design of the closed loop controlling system of the present invention with CIE 1931 tristimulus values as the reference inputs.

The block diagram for the reference tracking controlling system, which tracks the CIE 1931 tristimulus values, is shown in FIG. 4. Here, the transfer function for the RGB based white LED luminary 10 is represented by $G_{LED}(s)$ and the RGB LED driver 14 is represented by $G_{PS}(s)$. The parameters $[I_{fR}(s) \, I_{fG}(s) \, I_{fB}(s)]$ are the LED forward currents. In FIG. 4, $G_c(s)$ represents the transfer function for the controller 30. This controller 30 must have certain degree of robustness properties so that the performance of the controller 30, which is designed based on a model of the white LED luminary, does not vary significantly due to the variation in the LEDs. The Proportional-Integral (PI) controller would be an example for a robust controller, which posses certain degree of invariance and robustness properties for the variation in plant. The PI controller is illustrated here as an example, and the transfer function for the controller 30 is given as follows:

$$G_C(s) = \begin{bmatrix} Kp_{11} & Kp_{12} & Kp_{13} \\ Kp_{21} & Kp_{22} & Kp_{23} \\ Kp_{31} & Kp_{32} & Kp_{33} \end{bmatrix} + \frac{1}{s} \begin{bmatrix} Ki_{11} & Ki_{12} & Ki_{13} \\ Ki_{21} & Ki_{22} & Ki_{23} \\ Ki_{31} & Ki_{32} & Ki_{33} \end{bmatrix}$$

Where, Kp and Ki's are the proportional and the integral constants respectively, and they must be chosen properly to provide a stable closed loop system with the desired transient response. The block diagram in FIG. 4 is used for the design of the controlling system, which also decides the type of feedback system. The system described here is a unity feedback multi-input-multi-output reference tracking system. In FIG. 4, the error between the reference tristimulus values and the feedback tristimulus values are input to the controller 30. Since the controller 30 contains as integrator term, it derives the control action based on the present and the past errors, and drives the errors to zero by the controlling the forward currents. Under steady state condition, i.e. when the errors go to zero, the feedback tristimulus values follows their respective reference. In order to obtain good performance, the coefficients of the PI controller must be chosen carefully to provide a stable controlling system with the desired transient response. Various other controllers can be used for this purpose, and then, the feedback system can take different form depending on the controller.

From FIG. 4, the transfer function between the outputs of the white LED luminary 10 and the error input into the controller 30 s derived as, $$\frac{[XYZ]_w}{[XYZ]_{w-err}} = G_{LED}(s) * G_{PS}(s) * G_C(s)$$

Now, various control design techniques can be used to design the controlling system. One such an example would be to use the bode plot approach, and for this approach, the above described expression is used. It must be noted that the controlling system for the white LED luminary 10 is a multi-variable system and the gains of the controller 30 must be selected properly to provide a stable system with the desired dynamic response. A properly designed PI controller will provide a robust controlling system and can be independent of the variations in the LEDs.

Figure 5:
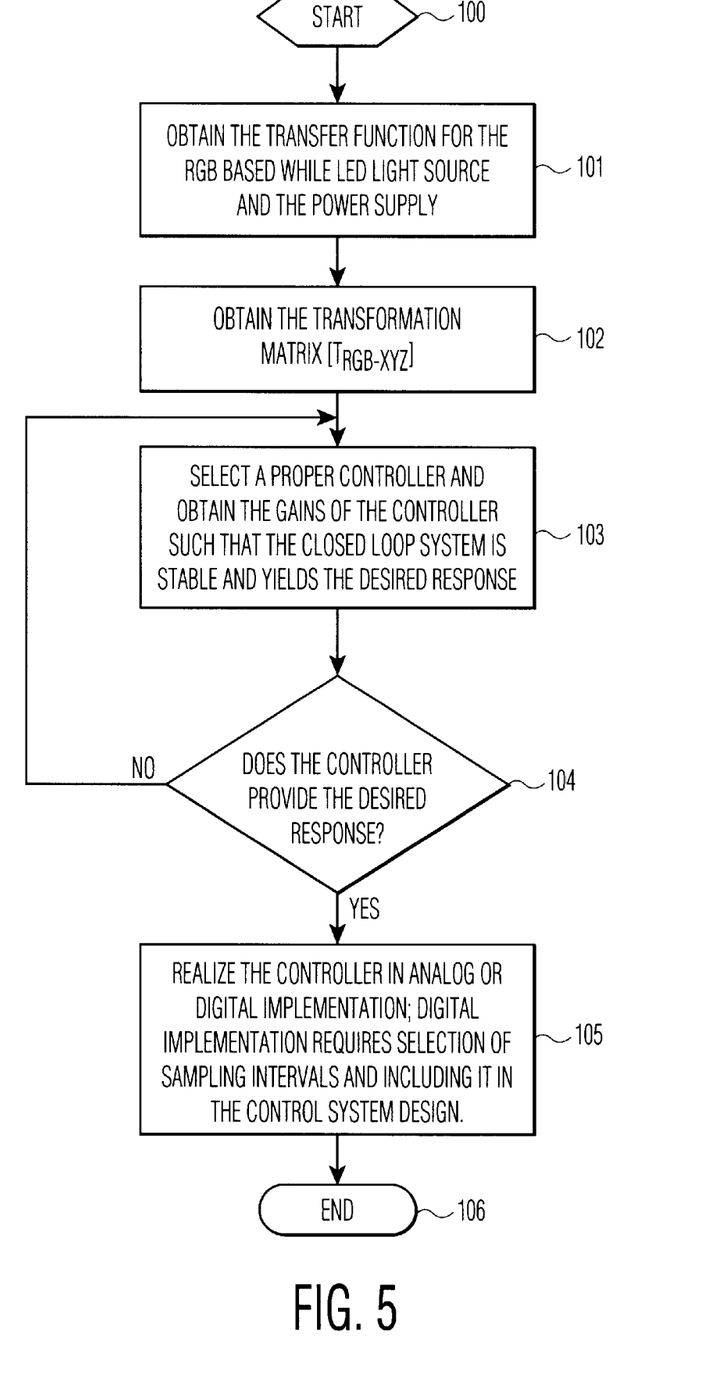
FIG. 5 is a flow chat for the selection of proper controller for the RGB based LED luminary.

FIG. 5 shows the procedure to select the proper controller and its gains. First, the transfer functions for the RGB based white LED luminary 10 and the power supply 13 are obtained at step 101. The transformation matrix [T] is then obtained for the photodiodes 21 and the white LED luminary 10, at step 102. Then, at step 103, a control function such as PI controller is selected and the gains of the controller is derived using a transfer function model shown in FIG. 4. Then the response of the controller 30 is verified by using simulation and experimentation at step 104, and if the response meets the desired one, then the controller 30 is implemented either in the analog or digital form at step 105. The digital implementation requires the selection of sampling interval and including the effect of sampling and hold in the design of control so that the controlling system still yields the desired response.

Figure 6:
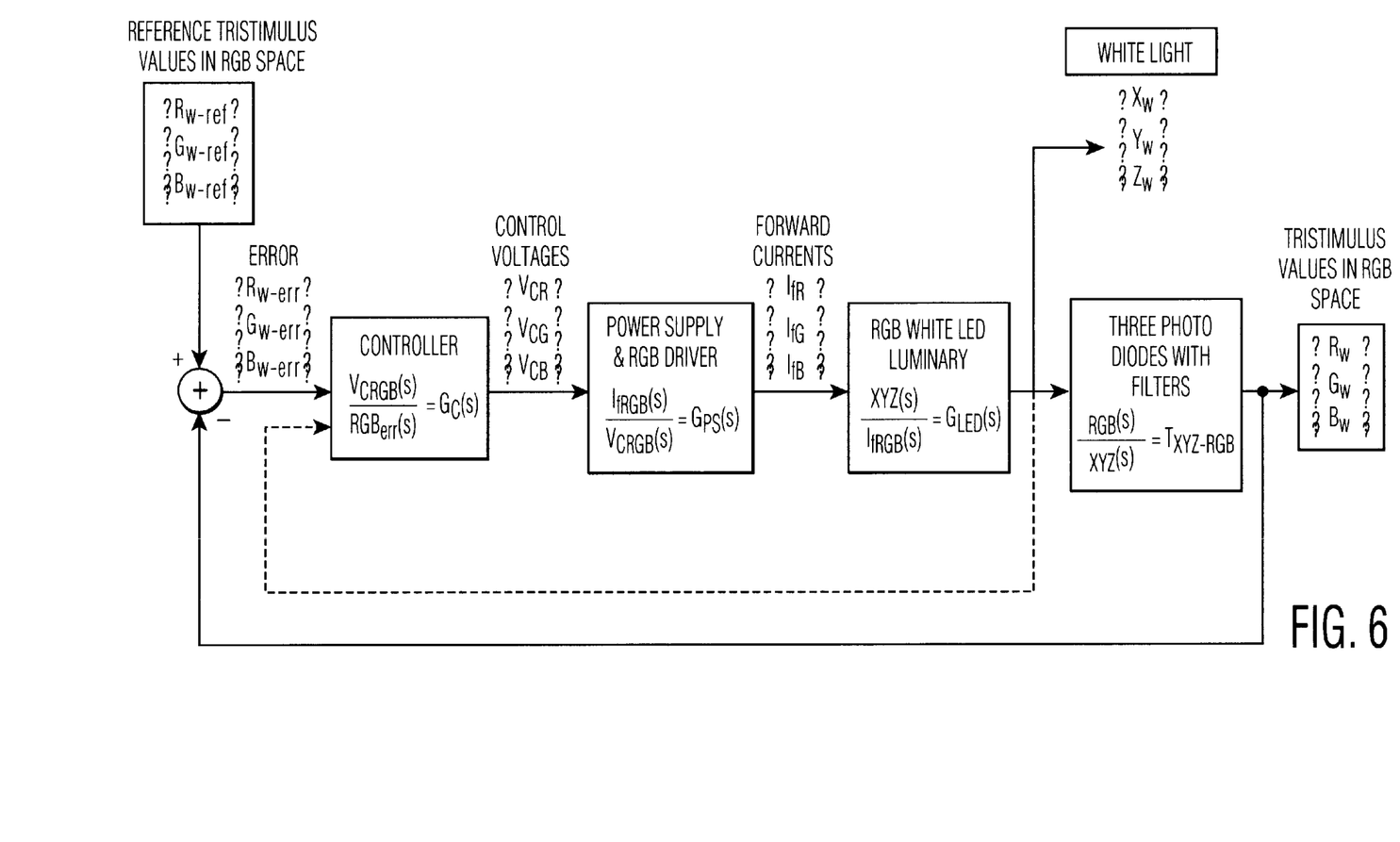
FIG. 6 illustrates the design of the closed loop controlling system of the present invention with tristimulus values in RGB calorimetric system as reference inputs.

FIG. 6 shows the block diagram for the feedback controlling system which tracks the tristimulus values in the RGB system. In the controlling system model, the outputs are the tristimulus values in the RGB system, which are the outputs of the photodiode 21 and amplifier combination. The CIE 1931 tristimulus values are the state-variables and the transformation matrix is the output matrix. The dotted line in FIG. 6 indicates that the state feedback can be also used here for the control.

The reference tracking system shown in FIG. 2 and FIG. 3 can be realized in analog or digital form. The digital implementation using micro-controller offers many features such as variable color control and dimming levels. For the digital implementation, the sampling must be included for the design of the controller. The controlling system design must also be carried out in discrete form. The control law in the sampled-data system (in order to implement in the digital form) for the above-mentioned PI controller is given as follows:

$$\begin{bmatrix} X_{w-err}(k) \\ Y_{w-err}(k) \\ Z_{w-err}(k) \end{bmatrix} = \begin{bmatrix} X_{w-ref}(k) \\ Y_{w-ref}(k) \\ Z_{w-ref}(k) \end{bmatrix} - \begin{bmatrix} X_w(k) \\ Y_w(k) \\ Z_w(k) \end{bmatrix}$$

$$\begin{bmatrix} V_{CR}(k) \\ V_{CG}(k) \\ V_{CB}(k) \end{bmatrix} = \left( \begin{bmatrix} Kp_{11} & Kp_{12} & Kp_{13} \\ Kp_{21} & Kp_{22} & Kp_{23} \\ Kp_{31} & Kp_{32} & Kp_{33} \end{bmatrix} - \frac{T_S}{2} \begin{bmatrix} Ki_{11} & Ki_{12} & Ki_{13} \\ Ki_{21} & Ki_{22} & Ki_{23} \\ Ki_{31} & Ki_{32} & Ki_{33} \end{bmatrix} \right) \cdot$$

$$\left( \begin{bmatrix} X_{w-err}(k) \\ Y_{w-err}(k) \\ Z_{w-err}(k) \end{bmatrix} - \begin{bmatrix} X_{w-err}(k-1) \\ Y_{w-err}(k-1) \\ Z_{w-err}(k-1) \end{bmatrix} \right) +$$

$$\begin{bmatrix} Ki_{11} & Ki_{12} & Ki_{13} \\ Ki_{21} & Ki_{22} & Ki_{23} \\ Ki_{31} & Ki_{32} & Ki_{33} \end{bmatrix} \cdot \begin{bmatrix} X_{w-err}(k) \\ Y_{w-err}(k) \\ Z_{w-err}(k) \end{bmatrix}$$

In the above expression, $T_S$ is the sampling interval, $[V_{CR}(k)\ V_{CG}(k)\ V_{CB}(k)]$ are the control voltages to power supplies, and $[X_{w-err}(k)\ Y_{w-err}(k)\ Z_{w-err}(k)]$ are the error between the reference and the feedback at the sampling interval k.

The above expression shows that the control voltages are linked with the three errors and therefore, the system reaches steady state only when all the three errors go to zero.

Figure 7A:
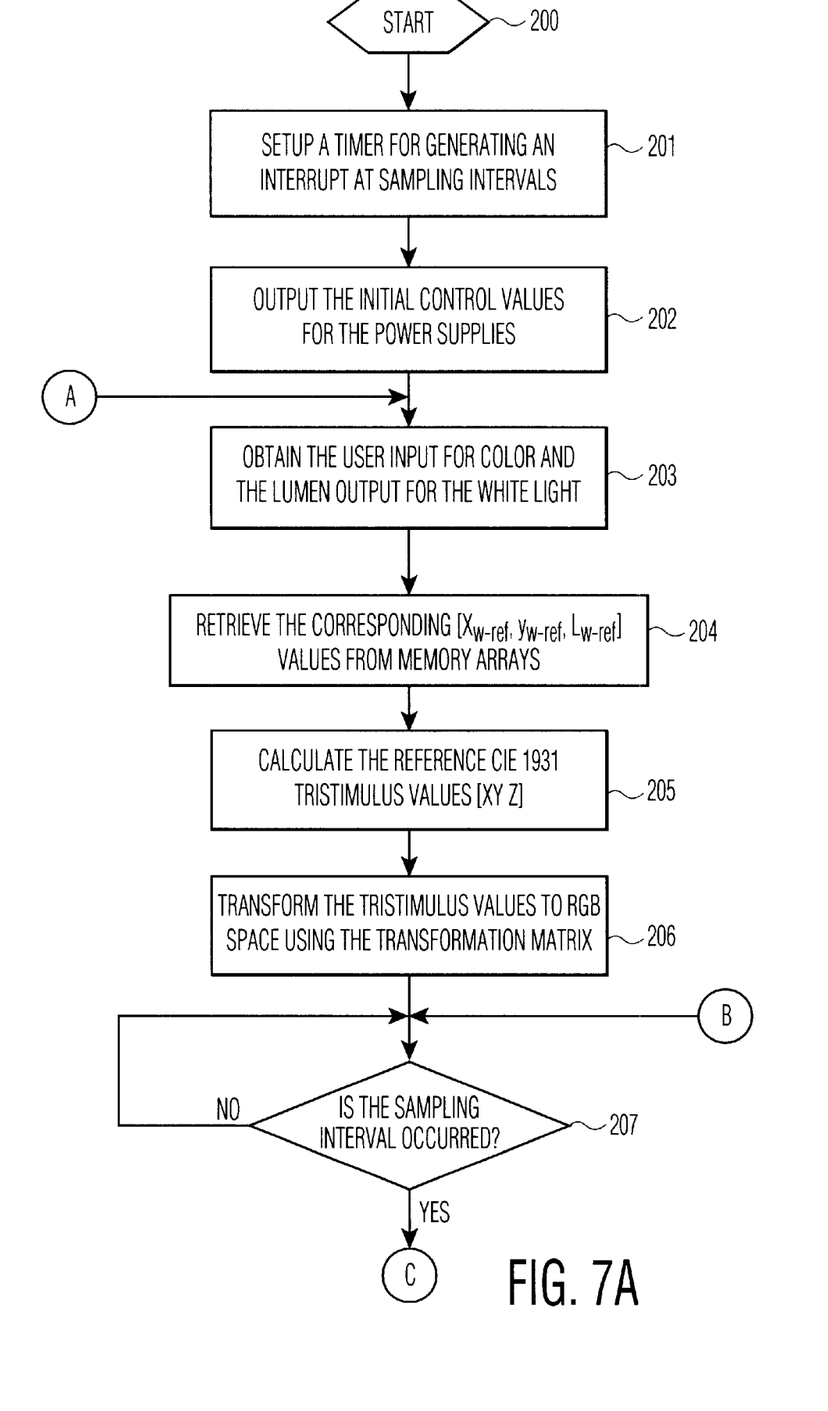
FIGS. 7a and 7b illustrates a flow chat for the control algorithm for the controlling system of the present invention.
Figure 7B:
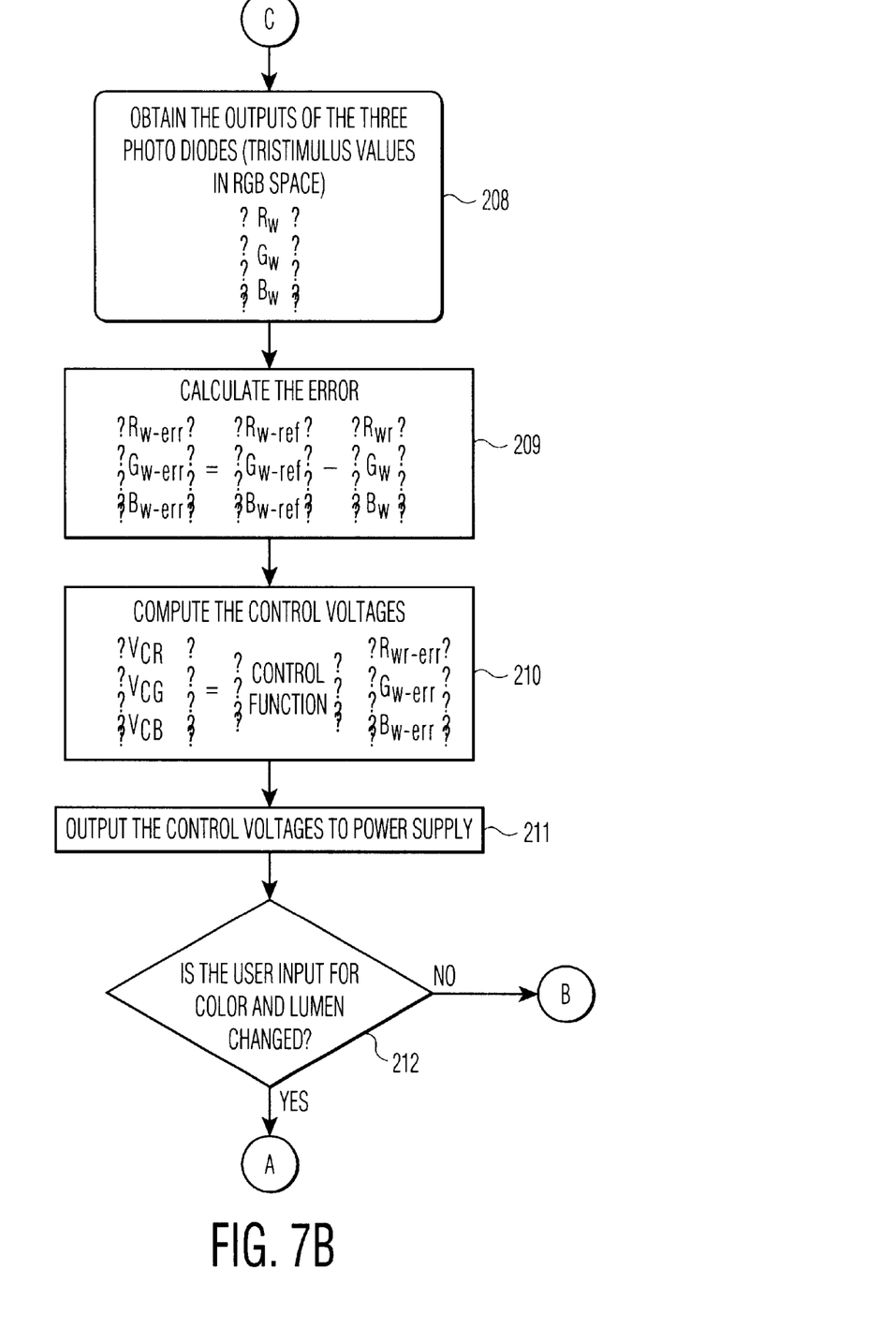

FIGS. 7a and 7b shows flow-chart for the control algorithm, if the controller 30 is implemented in the digital form. In the beginning step 201, the micro-controller 30 initializes the peripherals and setup a timer for generating the sampling intervals. Then, at step 202, it outputs the initial control values for the power supply, so that the system can be started. Since, the digital implementation offers the feature for variable color and dimming control, the micro-controller 30 first obtain the user input for the color control and dimming level at step 203. The user interface 31 may present the choice of the color in the form of descriptive words such as warm white, cool white, day light etc, or in the form of color temperature such as 2700° K, 5600° K etc. The dimming level may be presented in a range (e.g., 25%, 50%, and 100%). The user interface has the means to supplies these information in the appropriate form. The corresponding values of $x_{w-ref}$, $y_{w-ref}$ and the lumen output $L_{w-ref}$ are stored in a memory array and the micro-controller retrieves this information from the memory at step 204. Then the CIE 1931 tristimulus values are obtained at step 205 and the tristimulus values in the RGB space are obtained at step 206. If the tracking of the tristimulus values in the CIE 1931 tristimulus is desired, then this step can be omitted. Then, micro-controller waits for the sampling interval to occur at step 207.

After the sampling interval, the sampling of the outputs of the photodiodes 21 and amplifier combination is carried out at step 208 Then, with the error obtained at step 209, the controller calculates, at step 210, the control voltages for the power supplies based on the reference inputs and the feedback signals, and output the control voltages to power supply at step 211. Then the micro-controller checks whether the user input for the color and the dimming level is changed. If it is changed at step 212, and then the micro-controller repeats the functions as shown in FIG. 7, otherwise, it waits for the next sampling interval and performs the control action.

The above describes the reference-tracking controlling system for the control of the white light produced from the RGB based white LED luminary 10. It shall be appreciated that, since the reference tracking controlling system is used to control the tristimulus values, the controlling system can be used to control any color of the light that can be produced by a LED based luminary. Therefore, the application of the disclosure is not only limited to white light illumination, but also to any LED based illumination.

Numerous alternations and adaptations are possible to a skilled person in the art without departing the gist of the present invention. Therefore, the scope of the invention is intent to be solely defined by the accompanying claims.

What is claimed is:

1. A method of controlling an RGB based LED luminary driven by forward currents to produce a mixed light, said method comprising steps of:

acquiring a difference between feedback tristimulus values representative of said mixed light produced by said LED luminary and reference tristimulus values representative of a desired mixed light; and
   in response to said acquiring, adjusting said forward currents to decrease said difference between said feedback tristimulus values and said reference tristimulus values until said difference is zero.

2. The method of claim 1, wherein said step of acquiring is carried out in a controller.

3. The method of claim 2 further comprising a step of generating of said feedback tristimulus values.

4. The method of claim 3 wherein said step of generating of said feedback tristimulus values are carried out by photodiodes mounted within an optical assembly of said RGB based LED luminary.

5. The method of claim 3 further comprising a step of receiving said feedback tristimulus values by said controller.

6. The method of claim 5 wherein said tristimulus values are in a CIE 1931 tristimulus system.

7. The method of claim 6 further comprising, before said step of acquiring said difference between said feedback tristimulus values and said reference tristimulus values, a step of transferring said feedback tristimulus values in a new RGB calorimetric system into those in said CIE 1931 tristimulus system.

8. The method of claim 5 wherein said tristimulus values are in a new RGB colorimetric system.

9. The method of claim 8 further comprising, before said step of acquiring said difference between said feedback tristimulus values and said reference tristimulus values, a step of transferring said reference tristimulus values in a CIE 1931 tristimulus system into those in said new RGB colorimetric system.

10. The method of claim 2 further comprising a step of allowing a user to select said desired light at said controller whereby said controller obtains said reference tristimulus values.

11. The method of claim 10 wherein said reference tristimulus values are in the CIE 1931 tristimulus system.

12. The method of claim 2 wherein said step of adjusting further comprises a step of generating control voltages by said controller in response to said step of acquiring of said difference and applying said control voltages to LED drivers so as to adjust said forward currents.

13. The method of claim 1 wherein said steps of acquiring and adjusting are implemented by analog circuitry.

14. The method of claim 1 wherein said steps of acquiring and adjusting are implemented in digital form.

15. The method of claim 14 wherein said steps of acquiring and adjusting are carried out in predetermined time intervals.

16. The method of claim 15 further comprising a step of setting up a timer for generating said time intervals.

17. The method of claim 16 further comprising a step of selecting said desired light by selecting color temperatures and lumen output pre-stored in a memory.

18. A controlling system for a RGB based LED luminary driven by forward currents to produce a mixed light, comprising:

a feedback unit for generating feedback tristimulus values representative of said mixed light produced by said luminary; and
   a controller for acquiring a difference between said feedback tristimulus values and reference tristimulus values representative of a desired mixed light and for adjusting said forward currents in accordance to said difference so as to decrease said difference to zero.

19. The controlling system of claim 18 wherein said feedback unit comprises photodiodes with filters mounted within an optical assembly of said RGB based LED luminary.

20. The controlling system of claim 19 wherein said feedback unit further comprises amplifier and signal conversion circuitry for converting output photocurrents of said photodiode to voltage signals with proper amplifications.

21. The controlling system of claim 20 wherein said feedback unit further comprises means for transferring said feedback tristimulus values in a RGB colorimetric system into those in a CIE 1931 tristimulus system.

22. The controlling system of claim 20 wherein said feedback unit further comprises means for sending said feedback tristimulus values to said controller.

23. The controlling system of claim 18 wherein said controller comprises a user interface for a user to select said desired mixed light.

24. The controlling system of claim 23 wherein said controller further comprises means for acquiring said reference tristimulus values representative to said desired mixed light selected by said user.

25. The controlling system of claim 24 wherein said controller further comprises means for transferring said reference tristimulus values in a CIE 1931 tristimulus system into those in a RGB colorimetric system.

26. The controlling system of claim 18 wherein said controller comprises means for generating a control voltage in accordance to said difference between said feedback and reference tristimulus values and applying said control voltage to LED drivers of said RGB based LED luminary so as to adjust said forward currents.

27. The controlling system of claim 18 wherein said controller comprises means for receiving said feedback stimulus values from said feedback unit.

28. The controlling system of claim 18 wherein said controller works in analog circuitry.

29. The controlling system of claim 18 wherein said controller is implemented in a digital form.

30. The controlling system of claim 29 wherein said controller comprises a memory for pre-storing values of color temperatures and lumens that a user may select to represent said desired mixed light.

* * * * *